(12) United States Patent
Ling et al.

(10) Patent No.: US 11,593,216 B2
(45) Date of Patent: Feb. 28, 2023

(54) METHOD, DEVICE, AND COMPUTER PROGRAM PRODUCT FOR MANAGING FILE SYSTEM

(71) Applicant: EMC IP Holding Company LLC, Hopkinton, MA (US)

(72) Inventors: Qinghua Ling, Beijing (CN); Yifeng Lu, Shanghai (CN); Yue Qian, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 96 days.

(21) Appl. No.: 16/879,135

(22) Filed: May 20, 2020

(65) Prior Publication Data

US 2021/0133038 A1 May 6, 2021

(30) Foreign Application Priority Data

Oct. 30, 2019 (CN) .......................... 201911045391.8

(51) Int. Cl.
| | | |
|---|---|---|
| *G06F 11/14* | (2006.01) | |
| *G06F 16/11* | (2019.01) | |
| *G06F 16/178* | (2019.01) | |
| *G06F 11/20* | (2006.01) | |

(52) U.S. Cl.
CPC ........ *G06F 11/1451* (2013.01); *G06F 16/128* (2019.01); *G06F 16/178* (2019.01); *G06F 2201/80* (2013.01)

(58) Field of Classification Search
CPC .. G06F 11/1451; G06F 16/128; G06F 16/178; G06F 2201/80; G06F 16/11; G06F 11/1448; G06F 11/2056; G06F 11/2058; G06F 11/2082; G06F 11/1402; G06F 3/065; G06F 16/184; G06F 16/1844; G06F 11/2064; G06F 11/2074; G06F 11/2076; H04L 29/0854; H04L 67/1095
See application file for complete search history.

(56) References Cited

U.S. PATENT DOCUMENTS

| | | | | |
|---|---|---|---|---|
| 6,457,109 B1 * | 9/2002 | Milillo | ................ | G06F 3/0605 |
| | | | | 711/161 |
| 6,671,705 B1 * | 12/2003 | Duprey | ............... | G06F 11/2082 |
| 6,823,349 B1 * | 11/2004 | Taylor | ................ | G06F 11/2082 |
| 6,889,228 B1 * | 5/2005 | Federwisch | ......... | G06F 11/2058 |
| 7,308,545 B1 * | 12/2007 | Kekre | ................ | G06F 11/2097 |
| | | | | 707/999.202 |

(Continued)

*Primary Examiner* — Kuen S Lu
(74) *Attorney, Agent, or Firm* — BainwoodHuang (57) ABSTRACT

Techniques for managing a file system involve in response to receiving, at a first backup device of the file system, a request for replicating data of the file system from the first backup device to a second backup device of the file system, determining a synchronization state between the first backup device and the file system, the second backup device being a backup device located downstream of the first backup device; creating, based on the synchronization state, a target snapshot associated with the file system; and causing the data to be replicated from the first backup device to the second backup device based on the target snapshot. Therefore, the data backup flexibility and accuracy of a file system can be significantly improved and therefore the reliability of the whole system may be enhanced.

16 Claims, 3 Drawing Sheets

(56) References Cited

U.S. PATENT DOCUMENTS

| | | | |
|---|---|---|---|
| 9,037,821 B1* | 5/2015 | Shah | G06F 3/0655 |
| | | | 711/162 |
| 9,081,754 B1* | 7/2015 | Natanzon | G06F 11/2058 |
| 9,547,655 B1* | 1/2017 | Wang | G06F 16/128 |
| 9,881,014 B1* | 1/2018 | Bono | G06F 16/128 |
| 9,916,202 B1 | 3/2018 | Seela et al. | |
| 9,983,942 B1* | 5/2018 | Seela | G06F 11/2058 |
| 10,037,369 B1 | 7/2018 | Bono et al. | |
| 10,437,509 B1 | 10/2019 | Alexeev et al. | |
| 10,459,643 B2 | 10/2019 | Xu et al. | |
| 10,678,650 B1 | 6/2020 | Tummala et al. | |
| 10,733,161 B1 | 8/2020 | Davenport et al. | |
| 10,929,428 B1* | 2/2021 | Brahmadesam | G06F 16/2379 |
| 11,023,415 B2 | 6/2021 | Bono et al. | |
| 11,023,488 B1 | 6/2021 | Bono et al. | |
| 11,099,777 B2 | 8/2021 | Haravu et al. | |
| 11,199,989 B2 | 12/2021 | Yang et al. | |
| 2005/0050115 A1* | 3/2005 | Kekre | G06F 11/2071 |
| 2005/0193179 A1* | 9/2005 | Cochran | G06F 11/2074 |
| | | | 711/162 |
| 2018/0157430 A1* | 6/2018 | Brown | G06F 3/0619 |
| 2018/0217756 A1* | 8/2018 | Liu | G06F 3/0619 |

\* cited by examiner

METHOD, DEVICE, AND COMPUTER PROGRAM PRODUCT FOR MANAGING FILE SYSTEM

CROSS-REFERENCE TO RELATED APPLICATION

This application claims priority to Chinese Patent Application No. CN201911045391.8, on file at the China National Intellectual Property Administration (CNIPA), having a filing date of Oct. 30, 2019, and having "METHOD, DEVICE, AND COMPUTER PROGRAM PRODUCT FOR MANAGING FILE SYSTEM" as a title, the contents and teachings of which are herein incorporated by reference in their entirety.

FIELD

Embodiments of the present disclosure generally relate to the field of data storage, and more specifically, to a method, device, and computer program product for managing a file system.

BACKGROUND

Currently, it has been considered a cascade replication mode between synchronizing replication and asynchronizing replication. A synchronizing replication session includes a local mirror and a remote mirror, to ensure the same IO on the local storage resource and the remote storage resource. The asynchronizing replication refreshes delta using two internal snapshots and transfer the same to a remote site.

The synchronizing replication session uses a Remote Mirror Driver (RMD) to replicate data from a primary site to a secondary site. The RMD is a layered driver, which splits an IO on storage resource that participates in a synchronizing replication as a primary object, further transmits the same to the local and remote sites, and then returns it upon receiving acknowledgements from the two sites.

The asynchronizing replication is based on the snapshot technology, which uses two internal snapshots to transfer data alternatively. However, the asynchronizing replication creates or refreshes an internal snapshot without awareness of synchronizing replication and therefore sends a snapshot request directly via a control path to a Local Orchestration component (also called MLU).

SUMMARY

The embodiments of the present disclosure provide a method, device, and computer program product for managing a file system.

In a first aspect of the present disclosure, there is provided a method for managing a file system. The method includes in response to receiving, at a first backup device of the file system, a request for replicating data of the file system from the first backup device to a second backup device of the file system, determining a synchronization state between the first backup device and the file system, the second backup device being a backup device located downstream of the first backup device; creating, based on the synchronization state, a target snapshot associated with the file system; and causing the data to be replicated from the first backup device to the second backup device based on the target snapshot.

In a second aspect of the present disclosure, there is provided an electronic device. The device includes a processor; and a memory coupled to the processor and storing instructions to be executed, the instructions when executed by the processor causing the device to execute acts. The acts include in response to receiving, at a first backup device of the file system, a request for replicating data of the file system from the first backup device to a second backup device of the file system, determining a synchronization state between the first backup device and the file system, the second backup device being a backup device located downstream of the first backup device; creating, based on the synchronization state, a target snapshot associated with the file system; and causing the data to be replicated from the first backup device to the second backup device based on the target snapshot.

In a third aspect of the present disclosure, there is provided a computer program product tangibly stored on a non-transient computer readable medium and including machine executable instructions which cause, when executed, a machine to perform the method in the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar symbols refer to the same or similar elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Various example embodiments of the present disclosure will be described below with reference to the accompanying drawings. It would be appreciated that these drawings and description are provided only as example embodiments. It should be pointed out that alternative embodiments of the structure and method disclosed herein can be envisioned from the following description, and these alternative embodiments may be used without departing from principles as claimed herein.

It is to be understood that these example embodiments are discussed only for the purpose of enabling those skilled persons in the art to better understand and thus implement the present disclosure, rather than suggesting any limitations to the scope of the present disclosure.

As used herein, the term "includes", "comprises" and its variants are to be read as open-ended terms that mean "includes/comprises, but is not limited to." The term "based on" is to be read as "based at least in part on." The term "some embodiments" is to be read as "at least some embodiments"; and the term "another embodiment" is to be read as "at least one another embodiment". Relevant definitions of other terms may be included below.

Figure 1:
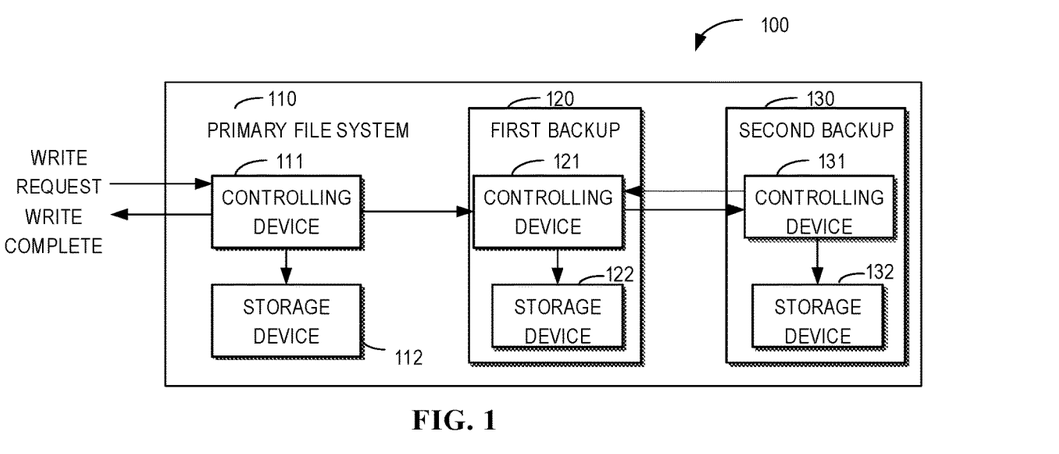
FIG. 1 illustrates a schematic diagram of an example operating environment in which embodiments of the present disclosure can be implemented.

FIG. 1 illustrates a schematic diagram of an example operating environment 100 in which embodiments of the present disclosure can be implemented. It would be appreciated that the structure and functionalities of the operating environment 100 are described merely as an example, without suggesting any limitation to the scope of the present disclosure. The embodiments of the present disclosure may be applied to the operating environment 100 having a different structure and/or functionalities.

As shown in FIG. 1, the operating environment 100 may include a primary file system 110. The primary file system 110 typically includes one or more backup devices. For example, the primary file system in FIG. 1 may include a first backup device 120 and a second backup device 130. The first backup device 120 may perform direct data transfer with the primary file system 110 while the second backup device 130 may perform direct data transfer with the first backup device 120. As a result, supposing that the primary file system 110 acts as a starting point of data transfer, the second backup device 130 is located downstream of the first backup device 120. The connection among the primary file system 110, the first backup device 120 and the second backup device 130 as shown in FIG. 1 is regarded as a cascade mode.

In the cascade mode, data synchronization of the primary file system 110 and the backup devices thereof may include synchronizing replication, i.e., data replication from the primary file system 110 to the first backup device 120. The data synchronization of the primary file system 110 and the backup devices thereof may further include asynchronizing replication, i.e., data replication from the first backup device 120 to the second backup device 130.

The process of synchronizing replication and asynchronizing replication will be described briefly below with reference to the operating environment 110 as shown in FIG. 1. The primary file system 110 receives a write request from a user. On one hand, a control device 111 of the primary file system 110 may transfer data to be written to a storage device 112 of the primary file system 110. On the other hand, as discussed above, a write IO is split into two IOs, and the further write IO split is transmitted via the control device 111 of the primary file system 110 to a control device 121 of the first backup device 120 which may transmit the data to be written to a storage device 122 of the first backup device 120. When the write at the storage device 112 of the primary file system 110 and the write at the storage device 122 of the first backup device 120 have been completed, it is considered that the synchronizing replication process has been completed. Once the write is completed, the primary file system 110 sends an indication on write completion to the outside.

Although FIG. 1 shows that the primary file system 110 and the first backup device 120 include a control device, respectively, it would be appreciated that the control device 111 of the primary file system 110 and the control device 121 of the first backup device 120 may be integrated into an overall control apparatus of the file system, or may act as respective modules in an overall control apparatus of the file system.

The RMD as mentioned above, for example, may be included in a control device. The IO is split on the storage resource participating in synchronizing replication as the primary object, then transmitted to local and remote sites, and finally returned upon receiving acknowledgement from two sites. The RMD tracks any change during mirror in a fracture state using a fixed bitmap called "Fracture Log", and transfers the same to the remote site during resynchronization.

Before a write is split into two, the RMD first marks bits in the "Fracture Log", and if the two writes complete successfully, the corresponding bits are cleared. Once a write fails to send secondary data due to a connection issue, a local write succeeds, and bits in the "Fracture Log" are marked to track a difference between the primary data and the secondary data. Prior to initial transfer, all bits are set in the "Fracture Log" to indicate full data transfer. In addition, during the resynchronization after failure is recovered, the resynchronized data depend on how many bits are set in the "Fracture Log."

Figure 2:
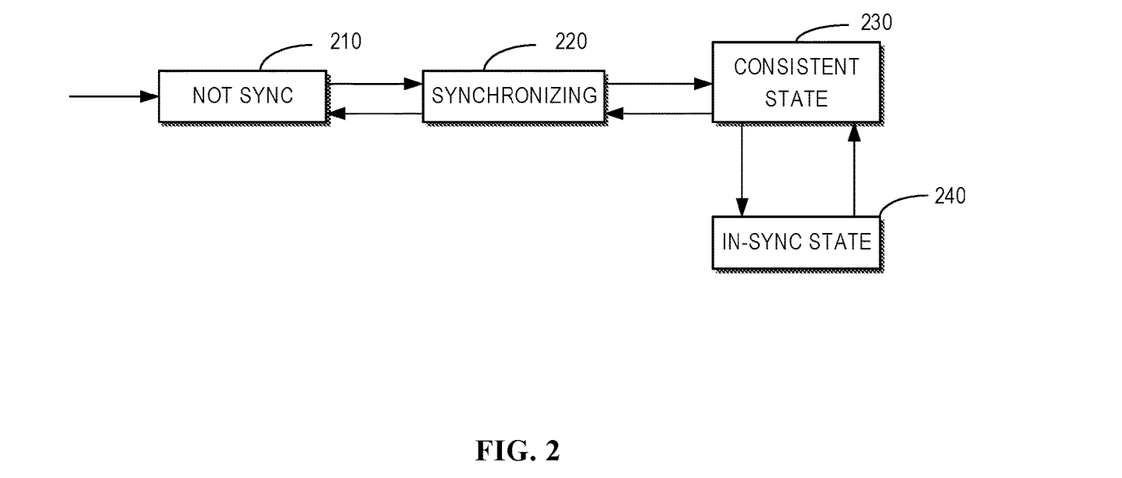
FIG. 2 illustrates a schematic block diagram of states at respective phases in a synchronizing replication process of a file system according to embodiments of the present disclosure.

FIG. 2 illustrates a schematic diagram of states at respective phases in a synchronizing replication process of a file system according to embodiments of the present disclosure. Hereinafter, reference will be made to FIGS. 1 and 2 to describe briefly respective phases of the synchronizing replication performed by the first backup device 120 and the primary file system 110.

As shown in FIG. 2, before creating a synchronizing replication session at the primary file system 110 and after starting initial data transfer or data resynchronization from the primary file system 110 to the first backup device 120, the first backup device 120 and the primary file system 110 are in an inconsistent state 210. After the data transfer is started, the first backup device 120 and the primary file system 110 are at a synchronizing state 220. After the data transfer is completed, the first backup device 120 and the primary file system 110 enter a consistent state 230. If there are no more IOs to be synchronized, the first backup device 120 and the primary file system 110 are at an in-synchronization state 240. If a new synchronizing session is started, the state between the first backup device 120 and the primary file system 110 is switched back to the inconsistent state 210.

Next, the asynchronizing replication process will be described below still with FIG. 1 as the example. The asynchronizing replication is based on the snapshot technology. The second backup device 130 may send a data synchronization request to the first backup device 120. The request, for example, may be sent from the control device 131 of the second backup device 130 to the control device 121 of the first backup device 120, for example to a Local Orchestration component (also called MLU) in the control device 121 of the first backup device 120. The control device 121 of the first backup device 120 generates a snapshot based on the current data state of the first backup device 120, to cause the second backup device 130 to synchronize data based on the snapshot.

Likewise, although FIG. 1 shows that the primary file system 110 and the second backup device 130 include a control device, respectively, it would be appreciated that the control device 111 of the primary file system 110 and the control device 131 of the second backup device 130 may be integrated in an overall control apparatus of the file system, or may act as respective modules in an overall control apparatus of the file system.

During synchronizing replication, a snapshot creating request is encapsulated into an IO request (also referred to as inband snapshot operation) and then sent to the RMD. Subsequently, the IO request is split into two requests, and more specifically, one IO request is for the primary file system 110 while the other IO request is for the first backup device 120. As a result, two snapshots are created with the same IO sequence. If the snapshot creation needs to be mirrored to the first backup device 120, the creation request is sent to the primary file system 110 and the same request is mirrored to the first backup device 120. If the snapshot creation does not need to be mirrored to the first backup device 120, the creation request is only sent to the primary file system 110, i.e., a snapshot is created at the primary file system 110 when the replication session is at a paused state. When the snapshot creation request arrives at the first backup device 120, the first backup device 120 first checks the mirror state. If it is a consistent state, a snapshot is created on the first backup device 120; and if not, the snap creation request fails.

In order to ensure that the first backup device 120 can be recovered from any failure, the synchronizing replication creates a consistent snapshot before the state change from consistent to inconsistent by initiating an inband snap operation from the primary file system 110 to the first backup device 120, and then starts data transfer. If any failure occurs during data transfer, the process moves to failover of the first backup device 120 such that the consistent snapshot can be recovered to the first backup device 120 to ensure data consistency, which means that the data transfer has been abandoned. If the data transfer is completed fully, the state will become consistent again, and the consistent snapshot will be deleted soon.

However, in the asynchronizing replication, since the snapshot creation request from the second backup device 130 is directly sent to the MLU of the first backup device 120, an internal snapshot of the first backup device 120 is created without awareness of the synchronizing replication state of the first backup device 120 and the primary file system 110 (i.e., it has not been determined yet whether the current first backup device 120 and the primary file system 110 at the synchronization state. Accordingly, it is hard to ensure the accuracy of the asynchronizing replication.

When the synchronizing replication is out of synchronization or in the progress of data transfer, the first backup device 120 and the primary file system 110 are inconsistent in content. If the file system is mounted at this time, it would crash. For a cascade replication mode, it is expected in the asynchronizing replication to synchronize the data from the first backup device 120 to the second backup device 130, which needs to create or refresh a snapshot on the first backup device 120. If the first backup device 120 has not been synchronized with the primary file system 110, the snapshot operation cannot be accomplished. As a result, the asynchronizing replication session would encounter failure and data cannot be synchronized. It means that the snapshot operation from the asynchronizing replication depends on the synchronizing replication state.

Therefore, the embodiments of the present disclosure provide a method for managing a file system, which can always ensure success of snapshot creation or refreshing on a backup device in synchronizing replication no matter whether a file system and a backup device are at a consistent state, thereby eliminating dependency of the asynchronizing replication on the synchronizing replication state.

Figure 3:
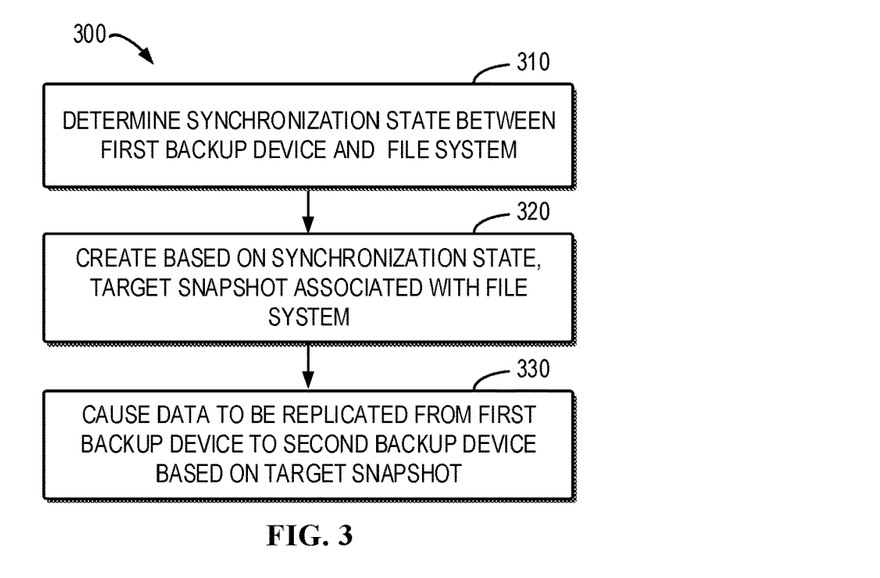
FIG. 3 illustrates a method 300 of managing a file system according to embodiments of the present disclosure.

FIG. 3 illustrates a flowchart of a method 300 for managing a file system according to some embodiments of the present disclosure. The method 300 may be implemented at a control device 121 in FIG. 1, or may be implemented at any other appropriate device of a file system integrated with the control device 121. For ease of illustration, the method 330 is described with reference to FIG. 1.

At block 310, if the first backup device 120 of the primary file system 110 receives a request for replicating data of the primary file system 110 from the first backup device 120 and the second backup device 130, the control device 121 determines the synchronization state between the first backup device 120 and the primary file system 110.

Figure 4:
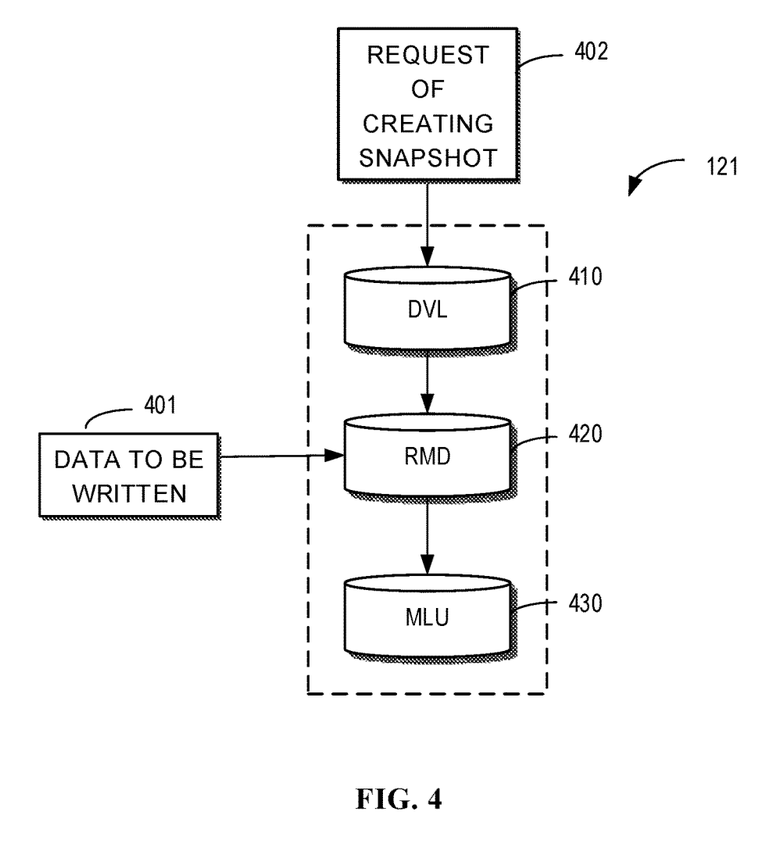
FIG. 4 illustrates a schematic diagram of business logic for executing asynchronizing replication according to embodiments of the present disclosure.

Different than the previous path for sending the asynchronizing request, i.e., the path for directly sending the snapshot creation request to the MLU of the control device 121, the asynchronizing request may be sent to the RMD of the control device 120. The RMD handles all IO requests to the storage device 122 at the lower layer of the first backup device 120, including a mirrored IO from the primary file system 110 and the inband snapshot creation request from asynchronization of the second backup device 130. FIG. 4 illustrates a schematic diagram of business logic for executing asynchronizing replication according to embodiments of the present disclosure.

As shown in FIG. 4, the inband snapshot creation operation in the asynchronizing replication includes sending the snapshot request via a data path, rather than a control path, to execute asynchronizing replication. The snapshot creation request 402 from the asynchronizing replication is handled by a Dart Volume Layer (DVL) 410 of the control device 121, and then transmitted to the RMD 420 of the control device 121. Given that the mirrored IO from the primary file system 110 is also sent to the RMD 420, the RMD 420 is always in an up-to-date synchronizing replication state when the snapshot operation is handled in the RMD 420, and it therefore is aware of whether the first backup device 120 and the primary file system 110 are in the consistent state or not. Otherwise, if the snapshot creation request 402 is directly sent to the MLU 430 of the control device 121, it cannot be obtained whether the first backup device 120 and the primary file system 110 are in the consistent state or not.

In some embodiments, the control device 121 may determine whether a synchronization operation is being performed between the primary file system 110 and the first backup device 120. If the control device 121 determines that a synchronization operation is being performed, a synchronization state can be determined based on a process of the synchronization operation. For example, if the synchronization operation has not been completed yet, it is determined that the first backup device is not synchronized with the file system.

In some embodiments, if the control device 121 determines that a synchronization operation is not being performed between, it may be further determined whether the data states of the primary file system 110 and the first backup device 120 are consistent. At this time, the primary file system 110 and the first backup device 120 may be inconsistent in data state because the synchronization between the primary file system 110 and the first backup device 120 is interrupted. The control device 120, for example, may obtain a first mirror characterizing (or identifying) the data state of the primary file system 110 and a second mirror characterizing the data state of the first backup device 120, and may determine, by comparing the first mirror and the second mirror, the synchronization state between the primary file system 110 and the first backup device 120.

Returning to FIG. 3, at block 320, the control system 121 creates a target snapshot associated with the primary file system 110 based on the determined synchronization state.

In some embodiments, if it is determined that the first backup device 120 is synchronized with the primary file system 110, the control device 120 may create the target snapshot based on the current replication of the data of the primary file system 110 in the first backup device 120.

In some embodiments, if it is determined that the first backup device 120 is not synchronized with the primary file system 110, a historic snapshot at a historical time point during previous synchronization between the first backup device and the primary file system 110 may be obtained and the target snapshot may be created. The historical snapshot may include a historical replication generated at the historical time point based on the data of the primary file system 110.

At block 330, the control device 121 causes the data of the primary file system 110 to be replicated, based on the target snapshot, from the first backup device 120 to the second backup device 130. In some embodiments, the target data to be synchronized to the second backup device 130 may be determined based on the target snapshot, and the target data may be replicated as the requested data to be synchronized to the second backup device 130.

Hence, the asynchronizing replication can work in the cascade mode, without impact from a synchronizing replication session. If a data transfer time of resynchronizing in the synchronizing replication exceeds a time interval (e.g., 10 min) of the asyn replication, the asynchronizing replication can obtain the same snapshot data after refreshing twice from the same consistent snap, and no data transfer is required in the time interval of the asynchronizing replication. This is meaningful because it is considered that no consistent data can be transferred on a host device (i.e., the first backup device 120).

In this way, a backup device for asynchronizing replication can always succeed in creating or refreshing a snapshot no matter whether a backup device executing synchronizing replication has completed data synchronization nor not. Therefore, the solution can improve significantly data backup flexibility and accuracy of a file system when enhancing reliability of the whole system.

Figure 5:
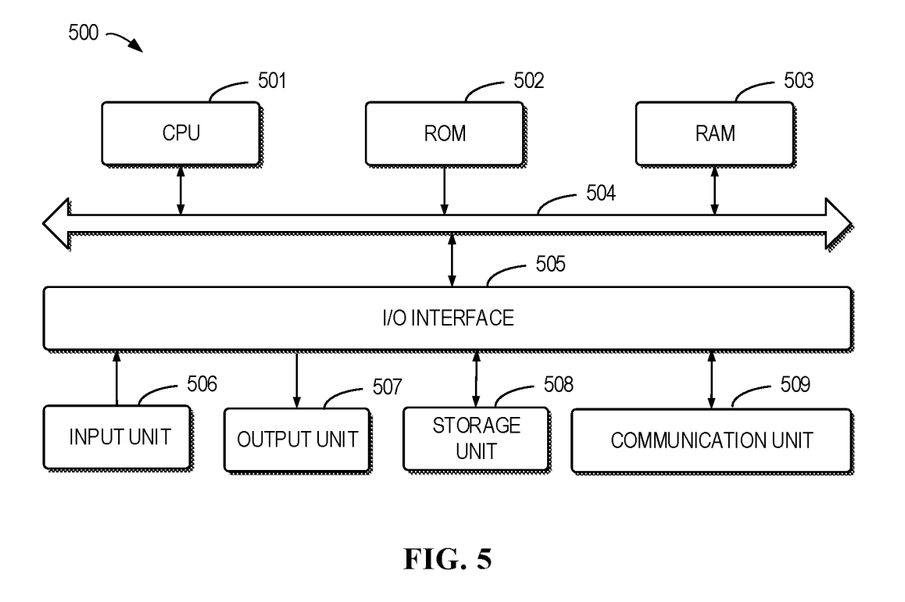
FIG. 5 illustrates a block diagram of an example device that can be used to implement embodiments of the present disclosure.

FIG. 5 is a block diagram illustrating an example device 500 that can be used to implement embodiments of the present disclosure. The device 500 may be any device implemented as or included in control devices 111, 121 and 131 in FIG. 1, or integrated with control devices 111, 121 and 131.

As shown in FIG. 5, the device 500 includes a central processing unit (CPU) 501 which performs various appropriate acts and processing, based on computer program instructions stored in a read-only memory (ROM) 502 or computer program instructions loaded from a storage unit 508 to a random access memory (RAM) 503. The RAM 503 stores therein various programs and data required for operations of the device 500. The CPU 501, the ROM 502 and the RAM 503 are connected via a bus 504 with one another. An input/output (I/O) interface 505 is also connected to the bus 504.

The following components in the device 500 are connected to the I/O interface 505: an input unit 506 such as a keyboard, a mouse and the like; an output unit 507 including various kinds of displays and a loudspeaker, etc.; a storage unit 508 including a magnetic disk, an optical disk, and etc.; a communication unit 509 including a network card, a modem, and a wireless communication transceiver, etc. The communication unit 509 allows the device 500 to exchange information/data with other devices through a computer network such as the Internet and/or various kinds of telecommunications networks.

Various processes and processing described above, e.g., the method 300, may be executed by the processing unit 501. For example, in some embodiments, the method 300 may be implemented as a computer software program that is tangibly included in a machine readable medium, e.g., the storage unit 508. In some embodiments, part or all of the computer programs may be loaded and/or mounted onto the device 500 via ROM 502 and/or communication unit 509. When the computer program is loaded to the RAM 503 and executed by the CPU 501, one or more steps of the method 300 as described above may be executed.

To sum up, embodiments of the present disclosure provide a method and device for data processing. In the premise of meeting the storage requirement arising from QAT, the present disclosure can avoid a system performance bottleneck in the legacy solution caused by a replication operation in the buffer area when providing a good compatibility with different platforms.

The present disclosure may be a method, device, system, and/or computer program product. The computer program product may include a computer readable storage medium having computer readable program instructions thereon for carrying out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means (e.g., specialized circuitry) for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing a file system comprising:
   in response to receiving, at a first backup device of the file system, by a driver in the first backup device via a data path, wherein the driver in the first backup device comprises a remote mirroring driver that also receives mirrored data from the file system, a request for replicating data of the file system from the first backup device to a second backup device of the file system, determining, from the remote mirroring driver, a synchronization state between the first backup device and the file system, the second backup device being a backup device that is able to transfer data directly with the first backup device but not with the file system;
   creating, based on the synchronization state, a target snapshot associated with the file system; and
   causing the data to be replicated from the first backup device to the second backup device based on the target snapshot.

2. The method of claim 1, wherein determining the synchronization state comprises:
   determining whether a synchronization operation is currently being performed between the file system and the first backup device; and
   in response to determining that the synchronization operation is currently being performed, determining the synchronization state based on a process of the synchronization operation.

3. The method of claim 2, further comprising:
in response to determining that the synchronization operation is not currently being performed, obtaining a first mirror characterizing a state of the data of the file system and a second mirror characterizing a state of data of the first backup device; and
determining the synchronization state based on comparing the first mirror with the second mirror.

4. The method of claim 1, wherein creating the target snapshot comprises:
in response to the first backup device being synchronized with the file system, creating the target snapshot based on a current replication of the data of the file system in the first backup device.

5. The method of claim 1, wherein creating the target snapshot comprises:
in response to the first backup device being asynchronized with the file system, obtaining a historical snapshot at a historical time point when the first backup device is synchronized with the file system, the historical snapshot comprising a historical replication generated based on the data of the file system at the historical time point; and
creating the target snapshot based on the historical snapshot.

6. The method of claim 1, wherein replicating the data comprises:
determining, based on the target snapshot, target data of the file system to be synchronized to the second backup device; and
replicating the target data as the data to the second backup device.

7. The method of claim 1, wherein the remote mirroring driver handles all input/output (IO) requests directed to the first backup device.

8. The method of claim 7, wherein the remote mirroring driver receives the request for replicating data of the file system from the first backup device to the second backup device from the second backup device.

9. The method of claim 8, wherein the request for replicating data of the file system from the first backup device to the second backup device is encapsulated in an IO request.

10. An electronic device comprising:
a processor; and
a memory coupled to the processor storing instructions to be executed, the instructions when executed by the processor causing the device to execute acts of:
in response to receiving, at a first backup device of the file system, by a driver in the first backup device via a data path, wherein the driver in the first backup device comprises a remote mirroring driver that also receives mirrored data from the file system, a request for replicating data of the file system from the first backup device to a second backup device of the file system, determining, from the remote mirroring driver, a synchronization state between the first backup device and the file system, the second backup device being a backup device that is able to transfer data directly with the first backup device but not with the file system;
creating, based on the synchronization state, a target snapshot associated with the file system; and
causing the data to be replicated from the first backup device to the second backup device based on the target snapshot.

11. The device of claim 10, wherein determining the synchronization state comprises:
determining whether a synchronization operation is currently being performed between the file system and the first backup device; and
in response to determining that the synchronization operation is currently being performed, determining the synchronization state based on a process of the synchronization operation.

12. The device of claim 11, wherein the acts further comprise:
in response to determining that the synchronization operation is not currently being performed, obtaining a first mirror characterizing a state of the data of the file system and a second mirror characterizing a state of data of the first backup device; and
determining the synchronization state based on comparing the first mirror with the second mirror.

13. The device of claim 10, wherein creating the target snapshot comprises:
in response to the first backup device being synchronized with the file system, creating the target snapshot based on a current replication of the data of the file system in the first backup device.

14. The device of claim 10, wherein creating the target snapshot comprises:
in response to the first backup device being asynchronized with the file system, obtaining a historical snapshot at a historical time point when the first backup device is synchronized with the file system, the historical snapshot comprising a historical replication generated based on the data of the file system at the historical time point; and
creating the target snapshot based on the historical snapshot.

15. The device of claim 10, wherein replicating the data comprises:
determining, based on the target snapshot, target data of the file system to be synchronized to the second backup device; and
replicating the target data as the data to the second backup device.

16. A computer program product having a non-transitory computer readable medium which stores a set of instructions to manage a file system; the set of instructions, when carried out by computerized circuitry, causing the computerized circuitry to perform a method of:
in response to receiving, at a first backup device of the file system, by a driver in the first backup device via a data path, wherein the driver in the first backup device comprises a remote mirroring driver that also receives mirrored data from the file system, a request for replicating data of the file system from the first backup device to a second backup device of the file system, determining, from the remote mirroring driver, a synchronization state between the first backup device and the file system, the second backup device being a backup device that is able to transfer data directly with the first backup device but not with the file system;
creating, based on the synchronization state, a target snapshot associated with the file system; and
causing the data to be replicated from the first backup device to the second backup device based on the target snapshot.

* * * * *